US010654363B2

(12) United States Patent
Hourtane et al.

(10) Patent No.: US 10,654,363 B2
(45) Date of Patent: May 19, 2020

(54) RECHARGING INSTALLATION FOR THE ELECTRIC CONDUCTION RECHARGING OF A VEHICLE (71) Applicant: ALSTOM TRANSPORT TECHNOLOGIES, Saint-Ouen (FR)

(72) Inventors: Jean-Luc Hourtane, Bouc Bel Air (FR); Francois Maurin, L'Hay les Ros (FR); Nicolas Nevot, Ozoir la Ferriere (FR)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 178 days.

(21) Appl. No.: 15/445,097

(22) Filed: Feb. 28, 2017

(65) Prior Publication Data
US 2017/0253135 A1 Sep. 7, 2017

(30) Foreign Application Priority Data
Mar. 2, 2016 (FR) ...................................... 16 51787

(51) Int. Cl.
B60L 5/14 (2006.01)
B60L 11/18 (2006.01)
(Continued)

(52) U.S. Cl.
CPC ............. B60L 11/1816 (2013.01); B60L 5/42 (2013.01); B60L 53/14 (2019.02); B60L 53/16 (2019.02);
(Continued)

(58) Field of Classification Search
CPC .............. B60L 11/1816; B60L 11/1818; B60L 11/1837; B60L 5/42; B60M 1/36
(Continued)

(56) References Cited

U.S. PATENT DOCUMENTS 3,886,427 A * 5/1975 Long ........................ H02J 7/027
320/156
3,955,657 A 5/1976 Bossi
(Continued)

FOREIGN PATENT DOCUMENTS

CN 104300657 1/2015
DE 102014214671 1/2016
(Continued)

OTHER PUBLICATIONS

Michael Kent: "The EVSE GMI circuit: Should the standards be changes?", Charged Magazine, Jan. 14, 2015, XP002763678.
(Continued)

Primary Examiner — Robert Grant
Assistant Examiner — John T Trischler
(74) Attorney, Agent, or Firm — Young & Thompson (57) ABSTRACT An installation for recharging an energy storage means, such as a battery of an electric vehicle, by conduction of energy from an electric power source to the energy storage means, where the battery is electrically connected to an on-board device and provided with a plurality of electric contacts, and on the ground, a ground device, combined with the on-board device, is connected to the electric power source and includes a plurality of electric contacts, each electric contact of the ground device being able to be put into contact with a corresponding contact of the on-board device, and the installation being able to safely apply an electric recharging power issued by the electric power source to the battery, where the plurality of electric contacts of the on-board device and of the ground device exclusively includes a phase contact and neutral contact.

12 Claims, 5 Drawing Sheets (51) Int. Cl.
*B60M 1/36* (2006.01)
*B60L 5/42* (2006.01)
*B60L 53/14* (2019.01)
*B60L 53/16* (2019.01)
*B60L 53/30* (2019.01)
*H04W 76/10* (2018.01)

(52) U.S. Cl.
CPC .............. *B60L 53/32* (2019.02); *B60M 1/36* (2013.01); *B60L 2200/18* (2013.01); *H04W 76/10* (2018.02); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 4,097,792 | A * | 6/1978 | Calaway | H02J 7/0081 320/151 |
| 4,158,802 | A * | 6/1979 | Rose, II | B60L 11/1824 320/109 |
| 4,360,790 | A * | 11/1982 | Heise | H03B 5/1256 331/114 |
| 4,725,780 | A * | 2/1988 | Yoda | G01R 33/3628 324/318 |
| 4,922,204 | A * | 5/1990 | Duerr | G01R 33/3685 324/318 |
| 6,317,697 | B1 * | 11/2001 | Yoshikawa | G01R 19/16542 320/149 |
| 6,557,476 | B2 * | 5/2003 | Batisse | B60L 9/18 104/289 |
| 7,193,338 | B2 * | 3/2007 | Ghali | H02B 5/00 307/147 |
| 7,560,935 | B2 * | 7/2009 | Morimoto | B60L 3/0023 324/503 |
| 7,679,369 | B2 * | 3/2010 | Hartzog | G01R 19/0084 320/118 |
| 8,259,423 | B2 * | 9/2012 | Gale | B60L 3/0069 361/42 |
| 8,289,664 | B2 * | 10/2012 | Haines | B60L 3/0069 361/42 |
| 8,324,858 | B2 * | 12/2012 | Hill | B60L 5/42 320/109 |
| 8,335,062 | B2 * | 12/2012 | Haines | H02H 3/00 320/109 |
| 8,400,106 | B2 * | 3/2013 | Midrouillet | B60L 11/1816 320/109 |
| 8,405,347 | B2 * | 3/2013 | Gale | B60L 11/1868 320/109 |
| 8,465,303 | B2 * | 6/2013 | Lacour | B60L 3/0069 320/106 |
| 8,493,024 | B2 * | 7/2013 | Kissel, Jr. | B60L 5/40 320/109 |
| 8,502,496 | B2 * | 8/2013 | Hofheinz | B60L 3/0023 180/65.21 |
| 8,575,940 | B2 * | 11/2013 | Yugou | B60L 3/04 307/10.1 |
| 8,616,311 | B2 * | 12/2013 | Tsurumi | H01M 2/0237 180/65.1 |
| 8,627,906 | B2 * | 1/2014 | Lacour | B60L 3/0069 180/2.1 |
| 8,680,813 | B2 * | 3/2014 | Lowenthal | B60L 53/665 320/109 |
| 8,692,513 | B2 * | 4/2014 | Gaul | B60L 11/1816 320/109 |
| 8,729,856 | B2 * | 5/2014 | Nathan | H01R 13/6683 320/109 |
| 8,763,773 | B2 * | 7/2014 | Asplund | B60L 5/40 191/22 C |
| 8,763,774 | B2 * | 7/2014 | Asplund | B60L 5/40 104/243 |
| 8,776,970 | B2 * | 7/2014 | Asplund | B60L 5/40 191/29 R |
| 8,794,410 | B2 * | 8/2014 | Asplund | B60L 5/40 191/22 C |
| 8,851,252 | B2 * | 10/2014 | Asplund | B60L 5/40 191/22 C |
| 8,851,253 | B2 * | 10/2014 | Asplund | B60L 5/42 191/29 R |
| 8,875,857 | B2 * | 11/2014 | Asplund | B60L 5/40 191/22 C |
| 8,981,715 | B2 * | 3/2015 | Ichikawa | G07C 5/085 320/109 |
| 9,035,486 | B2 * | 5/2015 | Asplund | B60L 5/40 307/10.1 |
| 9,162,577 | B2 * | 10/2015 | Asplund | B60L 5/42 |
| 9,199,541 | B2 * | 12/2015 | Asplund | B60L 5/42 |
| 9,214,734 | B2 * | 12/2015 | Huynh | H01Q 11/08 |
| 9,248,748 | B2 * | 2/2016 | Ghabbour | B60L 11/1816 |
| 9,373,968 | B2 * | 6/2016 | Kobayashi | H01M 10/44 |
| 9,376,023 | B2 * | 6/2016 | Messerschmidt | B60L 5/045 |
| 9,391,533 | B2 * | 7/2016 | Huang | H02M 5/458 |
| 9,573,478 | B2 * | 2/2017 | Jefferies | B60L 11/1818 |
| 9,610,852 | B2 * | 4/2017 | Lowenthal | B60L 11/1838 |
| 9,616,772 | B2 * | 4/2017 | Hourtane | B60L 5/39 |
| 9,707,850 | B2 * | 7/2017 | Jefferies | B60L 11/1816 |
| 9,733,291 | B2 * | 8/2017 | Bouchez | H02H 3/162 |
| 9,762,209 | B2 * | 9/2017 | Takamine | H03H 9/6433 |
| 9,796,399 | B2 * | 10/2017 | Hourtane | B61L 3/006 |
| 9,804,034 | B2 * | 10/2017 | Jefferies | B60L 11/1816 |
| 9,809,234 | B2 * | 11/2017 | Hourtane | B61L 3/006 |
| 9,811,137 | B2 * | 11/2017 | Hourtane | B61L 3/006 |
| 9,834,102 | B2 * | 12/2017 | Nakaya | H02J 3/383 |
| 9,868,365 | B2 * | 1/2018 | Hourtane | B60M 1/36 |
| 9,895,979 | B2 * | 2/2018 | Mitsutani | B60L 11/1818 |
| 10,059,210 | B2 * | 8/2018 | Yang | B60L 1/003 |
| 10,081,266 | B2 * | 9/2018 | Draeger | B60L 11/1829 |
| 2002/0096412 | A1 * | 7/2002 | Batisse | B60L 9/18 191/22 R |
| 2003/0034147 | A1 * | 2/2003 | Houck | B60H 1/3226 165/42 |
| 2005/0052801 | A1 * | 3/2005 | Ghali | H02B 5/00 361/62 |
| 2006/0076934 | A1 * | 4/2006 | Ogata | H02J 7/0031 320/136 |
| 2008/0277173 | A1 * | 11/2008 | Midrouillet | B60L 11/1816 180/65.1 |
| 2010/0039067 | A1 * | 2/2010 | Hill | B60L 5/42 320/109 |
| 2010/0207588 | A1 * | 8/2010 | Lowenthal | B60L 11/1838 320/165 |
| 2010/0320965 | A1 * | 12/2010 | Kissel, Jr. | B60L 5/40 320/109 |
| 2011/0013322 | A1 * | 1/2011 | Gale | B60L 3/0069 361/42 |
| 2011/0156643 | A1 * | 6/2011 | Chen | B60L 58/20 320/109 |
| 2011/0163715 | A1 | 7/2011 | Gale et al. | |
| 2011/0183329 | A1 | 7/2011 | Pathak et al. | |
| 2011/0210746 | A1 * | 9/2011 | Yugou | B60L 3/04 324/427 |
| 2011/0216451 | A1 * | 9/2011 | Haines | B60L 3/0069 361/42 |
| 2011/0216452 | A1 * | 9/2011 | Haines | H02H 3/00 361/42 |
| 2011/0256737 | A1 * | 10/2011 | Lacour | B60L 3/0069 439/34 |
| 2011/0259656 | A1 * | 10/2011 | Lacour | B60L 3/0069 180/65.1 |
| 2011/0273139 | A1 * | 11/2011 | Hofheinz | B60L 3/0023 320/109 |
| 2012/0007553 | A1 * | 1/2012 | Ichikawa | G07C 5/085 320/109 |
| 2012/0039092 | A1 * | 2/2012 | Xu | H02M 3/3376 363/17 |

(56) References Cited

U.S. PATENT DOCUMENTS

| | | | | |
|---|---|---|---|---|
| 2012/0067684 A1* | 3/2012 | Asplund | ................... | B60L 5/40 191/22 C |
| 2012/0092227 A1* | 4/2012 | Huynh | ................... | H01Q 11/08 343/859 |
| 2012/0139489 A1* | 6/2012 | Gaul | ................... | B60L 11/1816 320/109 |
| 2012/0212179 A1* | 8/2012 | Nathan | .............. | H01R 13/6683 320/109 |
| 2013/0020162 A1* | 1/2013 | Asplund | ................... | B60L 5/42 191/49 |
| 2013/0020164 A1* | 1/2013 | Asplund | ................... | B60L 5/40 191/29 R |
| 2013/0020165 A1* | 1/2013 | Asplund | ................... | B60L 5/40 191/29 R |
| 2013/0020866 A1* | 1/2013 | Asplund | ................... | B60L 5/40 307/9.1 |
| 2013/0025168 A1* | 1/2013 | Asplund | ................... | B60L 5/40 37/207 |
| 2013/0025989 A1* | 1/2013 | Asplund | ................... | B60L 5/42 191/49 |
| 2013/0025990 A1* | 1/2013 | Asplund | ................... | B60L 5/40 191/22 C |
| 2013/0025991 A1* | 1/2013 | Asplund | ................... | B60L 5/40 191/22 C |
| 2013/0025992 A1* | 1/2013 | Asplund | ................... | B60L 5/42 191/22 C |
| 2013/0088200 A1* | 4/2013 | Kamishima | ............... | B60L 3/04 320/109 |
| 2013/0214727 A1* | 8/2013 | Teng | ................... | H02J 7/0052 320/107 |
| 2013/0245876 A1* | 9/2013 | Messerschmidt | ....... | B60L 5/045 701/22 |
| 2013/0300429 A1* | 11/2013 | Jefferies | ................ | B60L 3/0069 324/511 |
| 2013/0320934 A1* | 12/2013 | Kobayashi | ............ | H01M 10/44 320/162 |
| 2014/0184176 A1* | 7/2014 | Huang | ................... | H02M 5/458 323/211 |
| 2014/0210412 A1* | 7/2014 | Lowenthal | .......... | B60L 11/1838 320/109 |
| 2015/0022153 A1* | 1/2015 | Bouchez | ................ | H02H 3/162 320/109 |
| 2015/0183329 A1 | 7/2015 | Nakaya | | |
| 2015/0274034 A1* | 10/2015 | Hourtane | ................... | B60L 5/39 191/6 |
| 2015/0274035 A1* | 10/2015 | Hourtane | ................... | B60M 1/36 191/6 |
| 2015/0318809 A1* | 11/2015 | Mitsutani | ................ | B60L 11/02 290/40 R |
| 2016/0068172 A1* | 3/2016 | Hourtane | ................... | B61L 3/006 701/19 |
| 2016/0137079 A1* | 5/2016 | Jefferies | .............. | B60L 11/1816 320/109 |
| 2016/0137082 A1* | 5/2016 | Jefferies | .............. | B60L 11/1818 320/109 |
| 2016/0138980 A1* | 5/2016 | Jefferies | .............. | B60L 11/1816 374/141 |
| 2016/0173061 A1* | 6/2016 | Takamine | ............ | H03H 9/6433 333/133 |
| 2016/0241061 A1 | 8/2016 | Werner et al. | | |
| 2016/0297310 A1* | 10/2016 | Kojima | ................ | B60L 11/1816 |
| 2016/0368390 A1* | 12/2016 | Yang | ....................... | B60L 1/003 |
| 2017/0043666 A1* | 2/2017 | Mitsutani | .................. | H02P 9/04 |
| 2017/0136906 A1 | 5/2017 | Draeger et al. | | |
| 2017/0282943 A1* | 10/2017 | Hourtane | ................ | B61L 3/006 |
| 2017/0282945 A1* | 10/2017 | Hourtane | ................ | B61L 3/006 |
| 2017/0349057 A1* | 12/2017 | Namba | ................ | B60L 11/18 |
| 2018/0141452 A1* | 5/2018 | Hourtane | ................... | B60L 5/42 |
| 2018/0201142 A1* | 7/2018 | Galin | .................. | B60L 11/1842 |
| 2018/0281607 A1* | 10/2018 | Galin | .................. | B60L 11/1842 |

FOREIGN PATENT DOCUMENTS

| | | | | |
|---|---|---|---|---|
| DE | 102014215350 | | 2/2016 | |
| EP | 3213955 | | 9/2017 | |
| FR | 2 940 201 A1 | | 6/2010 | |
| JP | 2009-045967 | | 3/2009 | |
| JP | 2010193570 A | * | 9/2010 | .......... B60L 11/1877 |
| JP | 2013-027144 | | 2/2013 | |
| JP | 5635134 | | 12/2014 | |
| WO | WO-2009103888 A2 | * | 8/2009 | ................ B60L 5/42 |

OTHER PUBLICATIONS

FR Search Report, dated Nov. 1, 2016, from corresponding from FR application.
European Search Report for Application No. 17158756, dated Jul. 21, 2017.
Tony Kuphaldt, "Lesson in Electric Circuits, vol. I, DC, Chapter 3 "Electrical Safety"", Oct. 18, 2006, pp. 77-117, XP055392241.

* cited by examiner

RECHARGING INSTALLATION FOR THE ELECTRIC CONDUCTION RECHARGING OF A VEHICLE

FIELD OF THE INVENTION

The present invention relates to installations for recharging by conduction energy storage means loaded on board electric or hybrid vehicles, notably buses.

BACKGROUND OF THE INVENTION

A tyre vehicle, like a bus, is specific in the sense that its chassis (and its body by electric continuity) is normally electrically insulated from the ground, because of its tires and this as compared with a railway vehicle, a tramway for example.

Recharging by conduction has many advantages as notably compared with the recharging by induction. It allows faster recharging, with a higher yield, and a less complex infrastructure and having a lower cost.

For recharging by conduction a bus, putting into contact an on-board device connected to energy storage means is presently contemplated with a ground device connected to an electric power source so as to establish four electric connections simultaneously:

A first neutral connection and a second phase connection for transferring electric power from the ground to on-board (or alternatively a first negative connection and a positive second connection);

A third ground connection in order to put the chassis of the bus to the ground potential and thereby ensure the safety of the persons around the bus during the power transfer; and, A fourth communication connection I allowing exchange of data according to a predefined protocol between on-board and the ground, for example the current charge condition of the energy storage means in order to adapt the electric parameters of the electric power to be provided, or for triggering the application of the recharging current when certain constraints are verified, such as the immobilization of the bus, certified grounding, etc.

Such an installation may assume the form of a male connector as an on-board device and a female connector as a ground device; of a pantograph as an on-board device and of an areal pole for the ground device; or further a current collector as an on-board device and a pad implanted in the track as a ground device.

Such an installation requiring the establishment of four connections by electrically connecting each pair of contacts of a set of four pairs, a pair including a contact on the on-board device and a corresponding contact on the ground device, remains complex to manufacture and to maintain in an operating condition.

SUMMARY OF THE INVENTION

There is a need for simplification while the guaranteeing the safety of persons during the recharging to which the present invention provides an answer.

Thus, the object of the invention is an installation for recharging by conduction including, on-board a vehicle equipped with an electric energy storage means, an on-board device, electrically connected to the electric energy storage means and provided with a plurality of electric contacts, and, on the ground, a ground device, combined with the on-board device, connected to an electric power source and including a plurality of electric contacts, each electric contact of the ground device being able to be put into contact with a corresponding contact of the on-board device and the installation is able to apply, safely, an electric recharging power delivered by the electric power source to the electric energy storage, characterized in that said plurality of electric contacts of the on-board device and of the ground device exclusively has two electric contacts, i.e. a phase contact and a neutral contact.

According to particular embodiments, the installation includes one or several of the following features, taken individually or according to all the technically possible combinations:

- the neutral contact of the on-board device is electrically connected to a chassis of the vehicle and the neutral contact of the ground device is electrically connected to a ground connection.
- the installation includes a means for controlling the ground connection able to check, at each instant of application of an electric recharging power to the electric energy storage means that the neutral contact of the on-board device is in electric contact with the neutral contact of the ground device and that the phase contact of the on-board device is in electrical contact with the phase contact of the ground device.
- the neutral contact of the on-board device includes a first electrode and a second electrode, and the phase contact of the on-board device includes a first electrode and a second electrode, the pair of first electrodes forming the input terminals of a first circuit for applying an electric recharging power to energy storage and the pair of first electrodes forming the input terminals of a second circuit for establishing a ground connection and for controlling the latter during the recharging, the second circuit belonging to the means for controlling the ground connection.
- the control means includes a transmitter, fitting out a device from among the ground device and the on-board device, able to apply an electric test signal to an electric circuit including the pair of phase contacts and the pair of neutral contacts and a receiver, fitting out the other device, able to receive the electric test signal exclusively when there is an effective contact between the pair of phase contacts and an effective contact between the pair of neutral contact, and able to transmit a reception signal of the electric test signal towards the transmitter, the reception signal being preferably transmitted by means of a wireless link established between a wireless communication module of the on-board device and a wireless communication module of the ground device.
- the ground device is able to disconnect from the electric power source when the electric test signal transmitted by the transmitter is not received by the receiver or when the reception signal of the test signal transmitted by the receiver is not received by the transmitter or is indicative of a breakage of an electric connectivity between the pairs of neutral contacts and the pair of phase contacts.
- the on-board device includes a link between the phase contact and the neutral contact consisting of a trap circuit in series with the primary of a transformer, to the secondary of which is connected the receiver, and in which the ground device includes a connection between the phase contact and the neutral contact consisting of a trap circuit in series with the primary of a transformer, to the secondary of which is connected the transmitter.

An installation dedicated to a vehicle of the bus type, the chassis of which is normally electrically insulated from the ground.

An installation wherein: the ground device includes a pad implanted in the roadway for circulation of the vehicle, so as to be flushed with the surface of said roadway, said pad bearing phase and neutral contacts of the ground device; and the on-board device includes at least one current collector, bearing the phase and neutral contacts of the on-board device, mounted so as to be movable relatively to the chassis of the vehicle and able to be displaced towards the pad so as to establish electric connectivity between the pairs of contacts.

the on-board device is mounted under a body of the vehicle, said vehicle having to be placed above the pad so as to allow establishment of an electric connectivity between the pairs of contacts of the ground and on-board devices, the pad being then located inside the ground imprint of the vehicle.

The object of the invention is also a recharging method for recharging a vehicle by using the previous installation, characterized in that it includes the steps consisting of: stopping the vehicle in a predefined recharging position relatively to a recharging station; putting the pair of contacts of the on-board device in contact with the pair of contacts of the ground device; recharging by applying an electric power generated by the source to the energy storage means, via the ground device and the on-board device; controlling the grounding of a chassis of the vehicle at each instant of the recharging, any negative verification leading to interrupting the recharging.

BRIEF DESCRIPTION OF THE DRAWINGS

The invention and advantages thereof will be better understood upon reading the detailed description which follows of a particular embodiment of the invention, exclusively given as an illustrative and non-limiting example. This description is made with reference to the appended drawings wherein.

DETAILED DESCRIPTION OF THE INVENTION

Figure 1A:
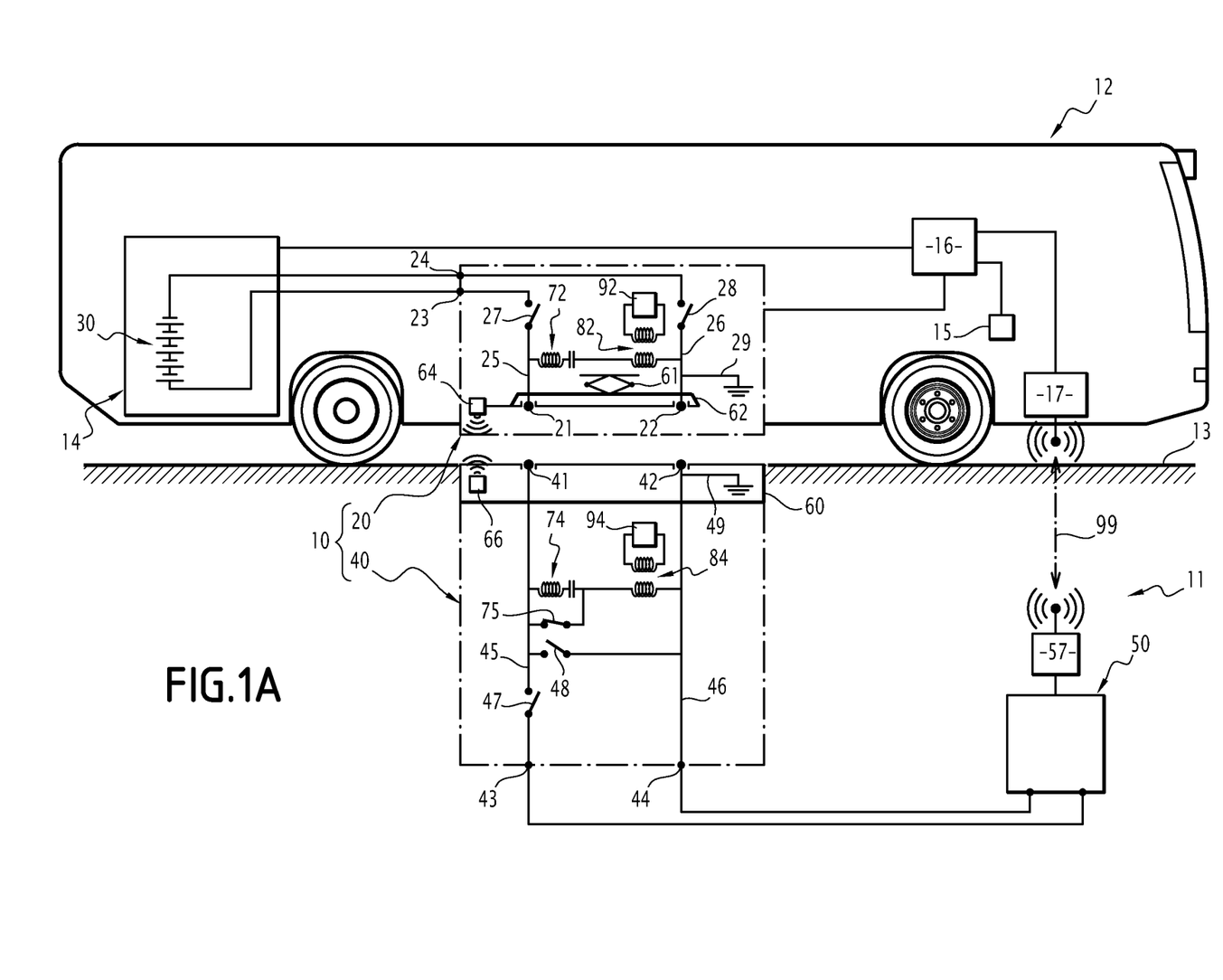
FIGS. 1A-1B schematically illustrate the recharging installation according to the invention.
Figure 1B:
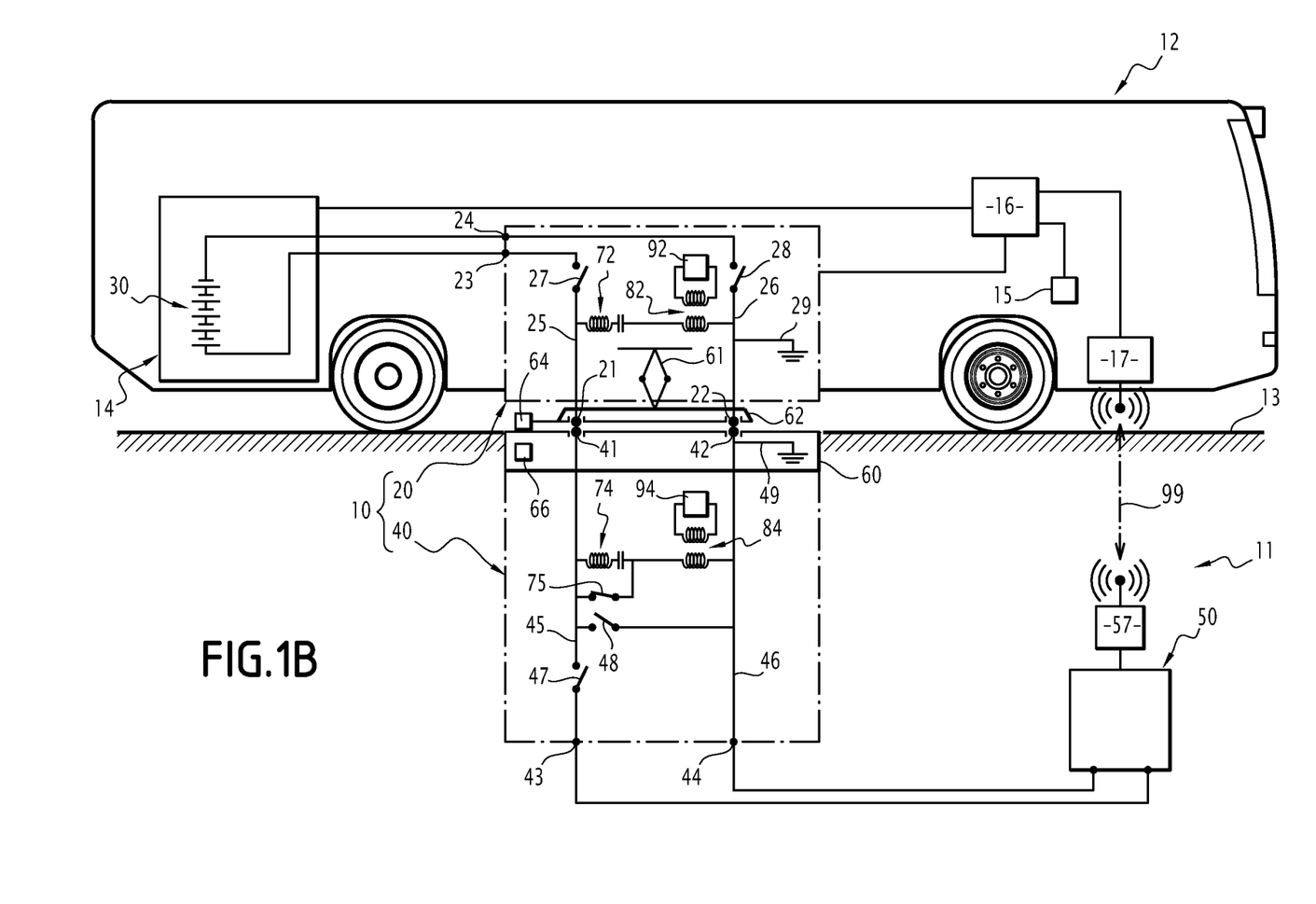

FIGS. 1A-1B illustrate an embodiment of a installation 10 for electric conduction recharging giving the possibility of applying, in safety, an electric power issued by a source 50 of a permanent recharging station 11, to a means for storing electric energy 30 belonging to a power circuit 14 of a bus 12.

The bus 12 includes a control and monitoring device 16.

It includes a module for measuring insulation 15, in order to make sure that the power circuit 14 is galvanically insulated from the chassis of the bus 12 at every instant.

It also includes a radio communication module 17 able to establish a wireless communication link 99 with a radio communication module 57, with which the source 50 is equipped. For example this is a wireless link applying a communication protocol compliant with the protocol known under the name of Bluetooth®.

The installation 10 includes, loaded on-board the bus 12, an on-board device 20.

As an input, the on-board device 20 exclusively includes two terminals, forming two contacts, respectively a phase contact 21 and a neutral contact 22. Alternatively, these contacts are a negative contact at a negative voltage, and a positive contact at a positive voltage.

At the output, the on-board device 20 is connected through first and second output terminals 23 and 24 to the terminals of the electric energy storage means 30, for example consisting of a battery, but other technical solutions are known to one skilled in the art.

The installation 10 includes at least one ground device 40, being part of the recharging station 11. Advantageously, the installation comprises two ground devices, the second device allowing a redundancy of the first device.

As an input, the ground device 40 is connected through first and second input terminals 43 and 44 to the terminals of the source 50. The source 50 is for example a sub-station for supplying power to an electric network.

As an output, the ground device 40 exclusively includes two output terminals forming two contacts, the phase contact 41 and the neutral contact 42 respectively.

In the embodiment shown here in detail, the contacts 41 and 42 of the ground device 40 are integrated into a pad 60, implanted into the roadway 13 so as to have a greater surface flush with the surface of the roadway for circulation of the bus 12.

The on-board device 20 then includes a shoe 62, also called a collector shoe or a collection system, mounted under the body of the bus 12 and able to be displaced vertically between an upper position away from the pad 60 and a low position in contact with the pad 60. In the low position, the phase contact 21 of the on-board device 20 is in electric contact with the phase contact 41 of the ground device 40 and the neutral contact 22 of the on-board device 20 is in electric contact with the neutral contact 42 of the ground device 40.

The on-board device 20 includes a link between a phase mesh 25 which connects the phase contact 21 and the first output terminal 23, and a neutral mesh 26 which connects the neutral contact 22 and the second output terminal 24.

This link includes a wave trap circuit 72, including an inductor and a capacitor, in series with the primary coil of a transformer 82.

At the secondary of the transformer 82, the on-board device 20 includes a receiver 92.

The trap circuit 72 is characterized by a tuning frequency $f_0$.

In proximity to the neutral contact 22, the neutral mesh 26 is electrically connected to the chassis of the bus 12. This is schematically illustrated in FIGS. 1A-1B by the ground connection 29.

Between this connection and the output terminals 23, 24, each mesh 25, 26 is equipped with a controlled contacter, 27 and 28, respectively, able to switch from an open state to a closed state.

The on-board device 20 includes a wireless communication module 64 with a short range for example of the RFID type, borne by the current collector 62 and connected to the receiver 92.

The ground device 40 includes a link between a phase mesh 45 which connects the phase contact 41 and the first input terminal 43 and a neutral mesh 46 which connects the neutral contact 42 and the second input terminal 44.

This connection includes a trap circuit 74, including an inductor and a capacitor, in series with the primary coil of a transformer 84.

At the secondary of the transformer 84, the ground device 40 includes a transmitter 94.

The trap circuit 74 is characterized by a tuning frequency which is selected so as to be substantially equal to the tuning frequency of the trap circuit 72.

In proximity to the neutral contact 42, the neutral mesh 46 is electrically connected to a ground connection. This is schematically illustrated in FIGS. 1A-1B by the ground connection 49.

Between the phase contact 41 and the output terminal 43, the phase mesh 45 is equipped with a controlled switch 47. Further, a safety contacter 48 is placed between the phase mesh and the neutral mesh. The contacter 48 is used for redundant safeguarding, and is only closed during an internal failure of the device 40, or during a maintenance intervention.

Finally, a switch 75 is placed in a bypass of the trap circuit 74, between the transformer 84 and the phase mesh 45.

The ground device 40 includes a wireless communication module 66 with a short range, for example of the RFID type, able to exchange data with the conjugate module 64. The module 66 is borne by the pad 60 and is connected to the transmitter 94.

Figure 2:
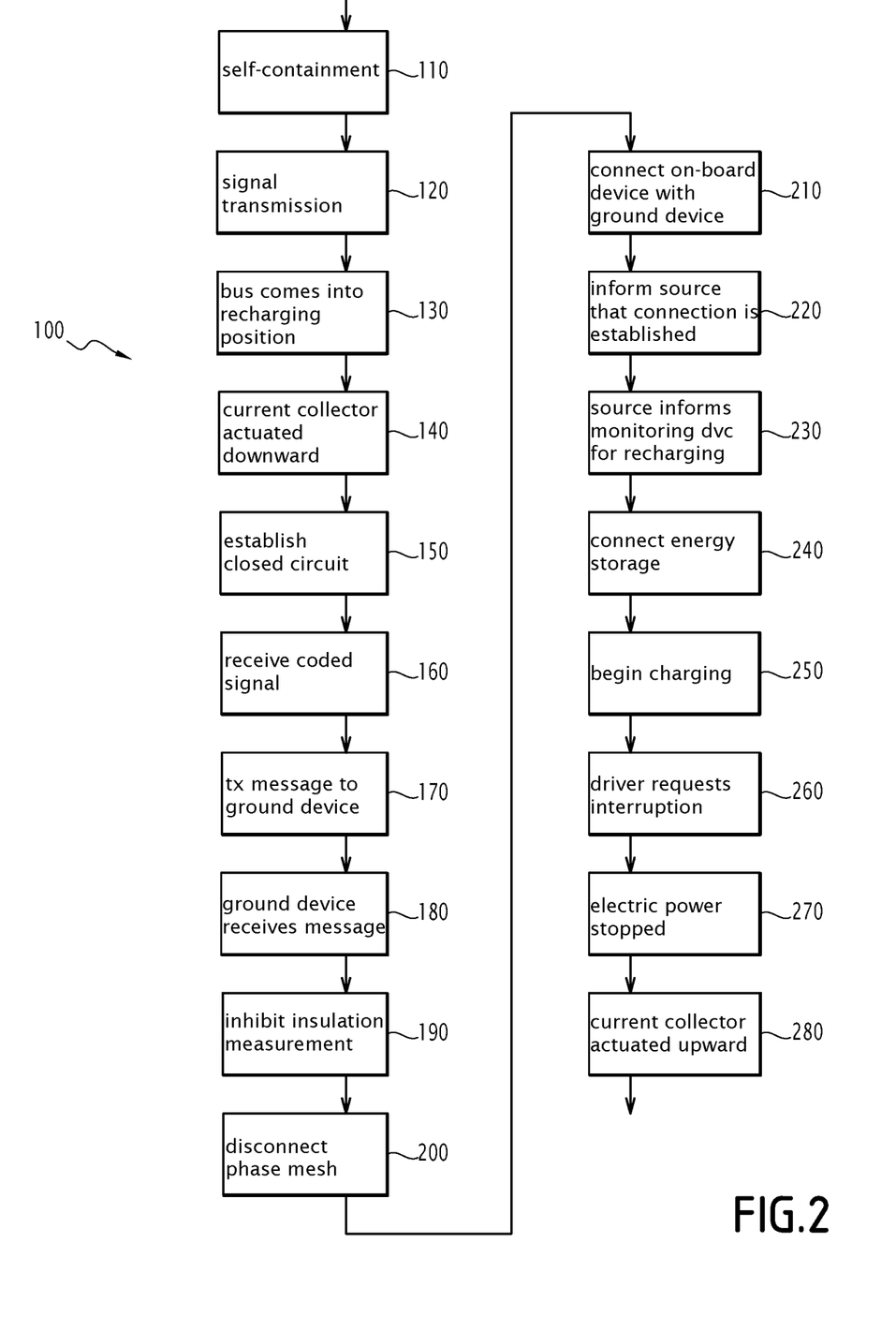
FIG. 2 illustrates as blocks, the recharging method using the installation of FIG. 1; and, FIGS. 3A-3B schematically illustrate an alternative of the recharging installation of FIGS. 1A-1B.

The recharging method 100 applied for recharging the energy storage means 30 of the bus 12 by using the installation 10 will now be described with reference to FIG. 2.

In self-containment (step 110), the power circuit 14 is galvanically insulated from the chassis of the bus 12. In particular, the contacter 28 is open, so that the electric energy storage means 30 is insulated from the chassis. The insulation measurement device 15 checks at each instant that the chassis is actually insulated from the power circuit 14.

The wireless communication module 66 on the ground permanently transmits a localization signal.

The transmitter 94 of the ground device 40 transmits (step 120) permanently a coded signal at the secondary of the transformer 84. However, the primary of the transformer 84 being in an open circuit, no current circulates in the primary of the transformer 84.

When the driver wishes to recharge the bus 12 which he/she drives, he/she approaches a recharging station 11 and stops it (step 130) in a predefined recharging position, indicated by suitable markings on the ground. In this recharging position, the current collector 62 is vertically above the pad 60.

Upon stopping the bus, the monitoring-control device 16 of the bus 12 detects the presence of the pad 60 by receiving the localization signal transmitted by the module 66 and received by the corresponding module 64 loaded on-board the bus. The monitoring-control device 16 of the bus 12 immobilizes the bus. It initiates the recharging process by controlling the downward movement of the current collector 62 for applying it against the pad 60 (step 140).

By doing this, the contact phase 21 of the on-board device 20 will come into electric contact with the phase contact 41 of the ground device 40 and the neutral contact 22 of the on-board device 20 will come into contact with the neutral contact 42 of the ground device 40.

Under these conditions, a closed circuit is established (step 150) including the primary of the transformer 84, the neutral mesh 46 of the ground device 20, the neutral mesh 26 of the on-board device 40, the primary of the transformer 82, the wave trap circuit 72, the phase mesh 25 of the on-board device 20, the phase mesh 45 of the ground device 40 and the closed contact 75.

In this way, the coded signal applied by the transmitter 94 to the secondary of the transformer 84 is transmitted through this closed circuit. It is transmitted as an electric test signal, which is an AC current at a frequency selected so as to correspond to the tuning frequency $f_0$ of the trap circuits 74 and 72.

This current crossing the primary of the transformer 84, it may be detected at the secondary by the receiver 92.

Thus, the receiver 92 receives (step 160) the coded signal. The receiver 92 uses this coded signal for elaborating a reception message for the electric test signal.

This message is then transmitted (step 170) from the on-board device 20 to the ground device 40 by means of the radioelectric link established between the wireless communication modules 64 and 66.

The receiver 66 receives (step 180) the reception message for the electric test signal.

The reception by the ground of the reception message for the electric test signal indicates that the contact between the pairs of contacts of the installation is correctly established, in particular that the chassis of the bus 12 is at ground potential, the link 29 being in an electric continuity with the link 49, via the neutral mesh 26 and the neutral mesh 46 connected together.

At this stage, the optional insulation measurement carried out by the device for measuring the insulation of the bus is inhibited (step 190) by the monitoring-control device 16 of the bus 12, the receiver 92 indicating that it receives the test signal.

In the next step, the grounding of the phase mesh 45 of the ground device 40 is disconnected (step 200), since the phase contact 41 is physically inaccessible (located under the bus) and the chassis of the bus 12 being grounded. The switch 75 is therefore switched to the open position.

Once the switch 75 is open, the test signal passes through the wave trap circuit 74.

The means for controlling the grounding, carried out in the present embodiment by transmitting a test signal through the ground, the reception of the test signal and the transmission of a reception message for the test signal by on-board, and finally the reception of the message of reception of the test signal by the ground, ensures permanent checking during the charging process.

Any loss of grounding, whatever the cause, leads to interrupting the recharging. In the present embodiment, this requires immediate disconnection of the pad 60 of the source 50 by opening the contacter 47, as well as by the momentary stopping of the transmission of the test signal by the transmitter 94, causing on-board the opening of the contacts 27 and 28, and the closing of the contacter 75.

It should be noted that the current carrying the coded signal is transmitted at the tuning frequency $f_0$ of the trap circuits 72 and 74. Thus, the trap circuits prevent any circulation of low frequency current (in particular of the recharging current) between the phase mesh and the corresponding neutral mesh (the capacitor behaving as an open circuit at a low frequency), but on the other hand allows the flow of a current with a frequency close to the tuning frequency (in particular the current carrying the test signal).

The contacter 47 is then closed (step 210) in order to establish an electric contact between the source 50 and the on-board device 20, via the ground device 40.

Next, by the wireless communication link 99 between the monitoring-control device 16 of the bus 12 and the source 50, the source 50 is informed (step 220) that a connection is established.

The source 50 adapts characteristics of the recharging current to be generated and to apply to the terminals of the ground device 40.

Advantageously, a measurement of the insulation between the input terminals 43 and 44 of the ground device 40 is then carried out by the source 50. This measurement is made at a low impedance, since the pad 60 on the ground has high leakage currents to the ground (a resistance from 10 to 1000 Ohms in the case of a pad wet by rain).

Next, the source 50 informs (step 230) the monitoring-control device 16 of the bus, via the wireless communication link 99, that recharging may begin.

The monitoring-control device 16 of the bus 12 then switches (step 240) to closing the contacters 27 and 28 of the on-board device 20 in order to connect the latter to the terminals of the energy storage means 30.

The charging then begins (step 250).

It is maintained until reception (step 260) by the driver of the bus of a request for interrupting the power supply.

The source 50, informed on the interruption of the power supply, stops applying an electric power between the input terminals of the ground device 40. The contacters 27 and 28 are opened (step 270) and the ground device 40 switches to opening the contacter 47, to closing the contacter for connecting to the ground 75.

The current collector 62 may then be actuated so as to be replaced in its upper position, before the bus leaves (step 280).

Figure 3A:
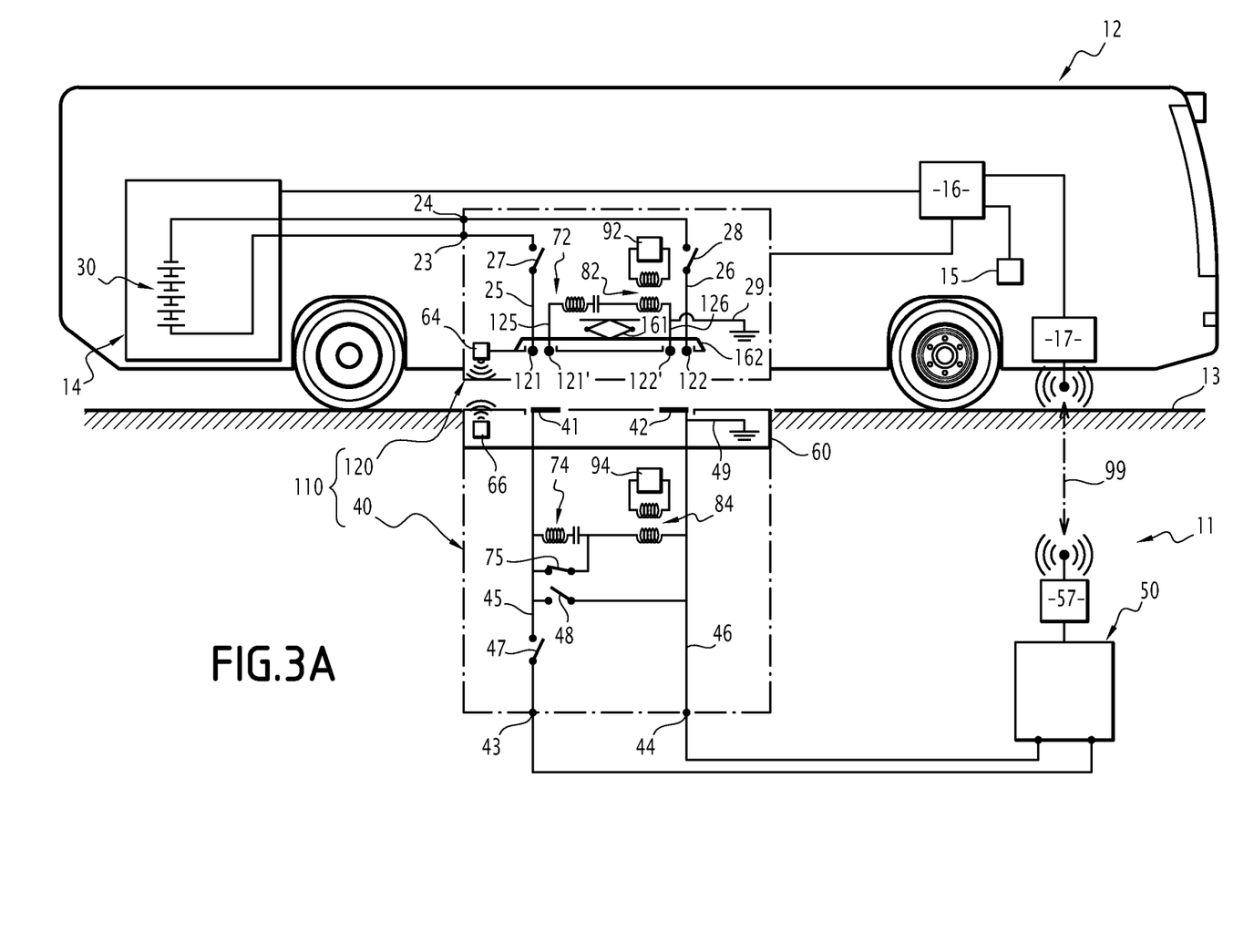
Figure 3B:
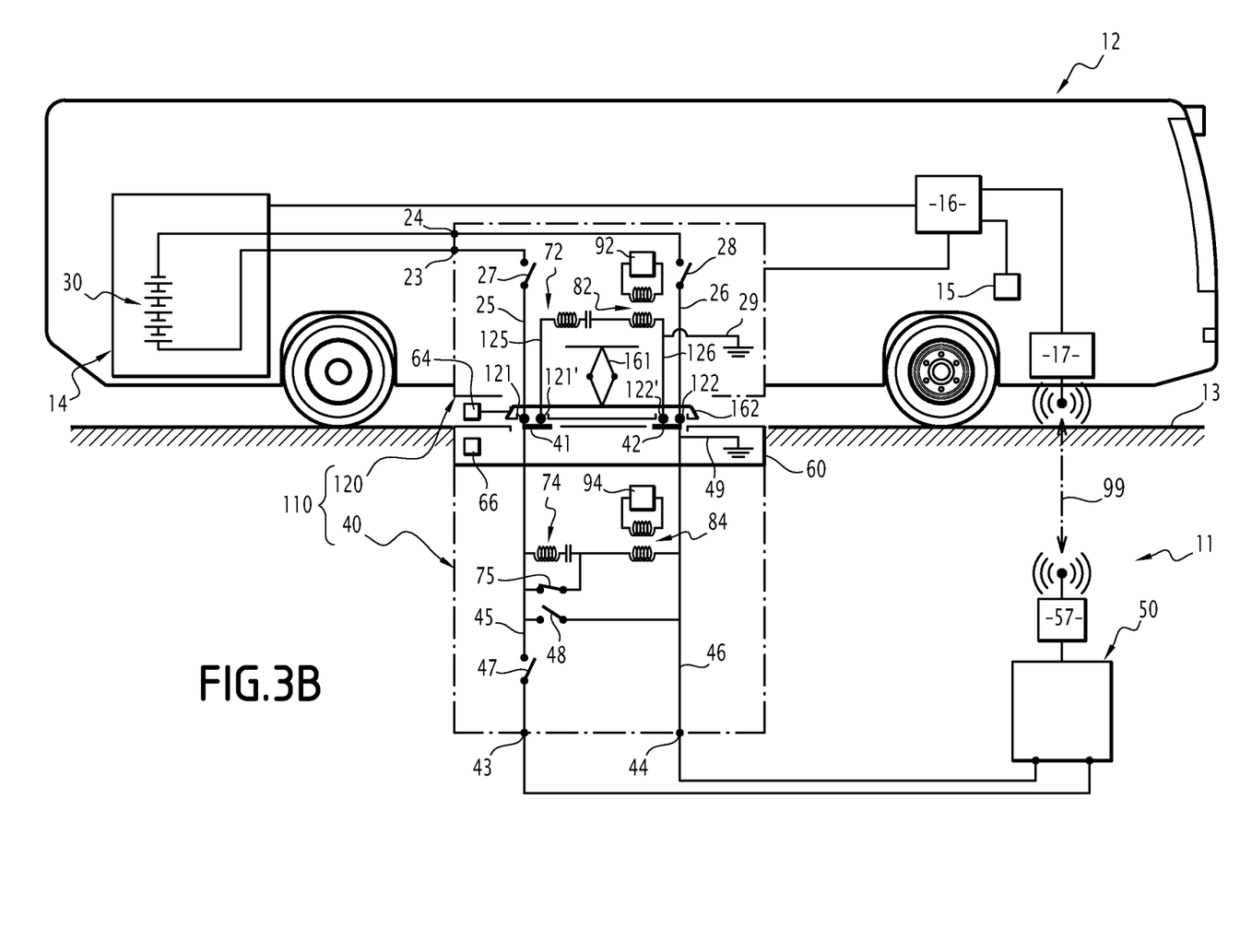

An alternative embodiment is illustrated in FIGS. 3A-3B. In these figures, an element identical with an element of FIGS. 1A-1B is designated by the reference number used, in FIGS. 1A-1B, for designating this identical element and an element similar to an element of FIGS. 1A-1B is designated by the reference number used, in FIGS. 1A-1B, for designating this similar element, increased by a hundred.

In this alternative embodiment, the on-board device 120 of the installation 110 includes a first circuit for conveying the electric power towards the battery and a second circuit for establishing the connection for connecting to the ground and its control. The first and second circuits are independent of each other. This independence is required in order to avoid the effects of a potential difference related to the formation of an electric arc between pairs of contacts when the current collector is moved closer or away from the pad on the ground.

Thus, the current collector 162 bears contacts which consist of two electrodes.

More specifically, above the phase contact 41 of the pad on the ground 60 and coming into contact simultaneously with the latter, the phase contact of the current collector 162 consists of two electrodes 121 and 121' distinct and electrically insulated from each other.

Also, above the neutral contact 42 of the pad on the ground 60 and coming into contact simultaneously with the latter, the neutral contact of the current collector 162 consists of two electrodes 122 and 122' distinct and electrically insulated from each other.

Thus, the first circuit (electrode 121, phase mesh 25, contacter 27, energy storage means, contacter 28, neutral mesh 26 and electrode 122) is dedicated and suitable for the passing of a recharging current.

The second circuit (electrode 121', wave trap circuit 72, primary of the transformer 82 and electrode 122', as well as the connection 29 to the ground on the side of the electrode 122') is dedicated and suitable for establishing the connection to the ground and to the circulation of the signal for checking grounding.

The invention claimed is:

1. An installation for electric conduction recharging, comprising:
   an on board device, provided on board a vehicle equipped with an electric energy storage means, the on-board device being electrically connected to the electric energy storage means and equipped with two electric contacts consisting of a first phase contact and a first neutral contact; and
   a ground device, provided on the ground, configured to cooperate with the on board device, the ground device being connected to an electric power source and equipped with two electric contacts consisting of a second phase contact and a second neutral contact, each of the electric contacts of the ground device being able to make contact with a corresponding one of the electric contacts of the on board device,
   the on board device and the ground device being configured to apply an electric recharging power delivered by the electric power source to the electric energy storage means,
   the first neutral contact being electrically connected to a chassis of the vehicle, and
   the second neutral contact of the ground device being electrically connected to a ground connection; and
   a ground connection controlling means for checking, during operational application of the electric recharging power to the electric energy storage means, that i) the first neutral contact of the on board device is in electrical contact with the second neutral contact of the ground device and ii) that the first phase contact of the on board device is in electric contact with the second phase contact of the ground device,
   the ground connection controlling means including:
      a transmitter, equipped with one of the ground device and the on board device, that applies an electric test signal to an electric circuit including the first and second phase contacts and the first and second neutral contacts, and
      a receiver, equipped with the other of the ground device and the on board device, that receives the electric test signal only when an effective contact exists between the first and second phase contacts and an effective contact between the first and second neutral contacts, and that transmits a signal of reception of the electric test signal towards the transmitter.

2. The installation of claim 1, wherein the signal of reception is transmitted by means of a wireless link established between a wireless communication module of the on board device and a wireless communication module of the ground device.

3. The installation of claim 1, dedicated to a vehicle of a tyre vehicle type, a chassis of which is normally electrically insulated from the ground.

4. The installation of claim 1, wherein the ground device is arranged in a space provided in the ground such that the second phase contact and the second neutral contact are located beneath the on board device of the vehicle.

5. The installation of claim 1, wherein the first phase contact and the first neutral contact are arranged on an underside of the chassis of the vehicle in a manner so as to be brought into connection with the second phase contact and the second neutral contact of the ground device located beneath the vehicle.

6. The installation of claim 1, wherein the first neutral contact of the on board device includes a first electrode and a second electrode, and the first phase contact of the on board device includes a third electrode and a fourth electrode, the first and third electrodes forming input terminals of a first circuit for applying an electric recharging power to the energy storage means, and the second and fourth electrodes forming input terminals of a second circuit for establishing a ground connection and for controlling said ground connection during the application of the electric recharging power to the electric energy storage means, the second circuit being part to the ground connection controlling means.

7. The installation of claim 6, wherein none of the first, third, second, and fourth electrodes are not electrically connected when the onboard device is not in contact with the ground device.

8. The installation of claim 1, wherein the ground device disconnects itself from the electric power source when the electric test signal transmitted by the transmitter is not received by the receiver, or when the signal of reception of the electric test signal transmitted by the receiver is either not received by the transmitter or is indicative of a break of the electric contact between the first and second neutral contacts or the first and second phase contacts.

9. The installation of claim 8,
wherein the on board device includes a connection between the first phase contact and the first neutral contact, consisting of a wave trap circuit in series with a primary of a first transformer, a secondary of said first transformer connected to the receiver, and
wherein the ground device includes a connection between the second phase contact and the second neutral contact, consisting of a wave trap circuit in series with a primary of a second transformer, a secondary of said second transformer connected to the transmitter.

10. The installation of claim 1, wherein:
the ground device includes a pad, located in a roadway, the pad being flush with a surface of said roadway, and the pad bearing the second phase contact and the second neutral contact of the ground device, and
the on board device includes at least one current collector that bears the first phase contact and first neutral contact of the on board device, the current collector being mounted on the vehicle so as to be movable relative to a chassis of the vehicle so as to be displaced towards the pad in order to establish the electric contact between the contacts of the on board device and the ground device.

11. The installation of claim 10, wherein the on board device is mounted under a body of the vehicle, the vehicle having to be placed above the pad, such that the pad is located inside a ground footprint of the vehicle, in order to allow the establishment of an electric contact between the contacts of the ground device and on board device.

12. An installation for electric conduction recharging, comprising:
an on board device, provided on board a vehicle equipped with an electric energy storage means, the on-board device being electrically connected to the electric energy storage means and equipped with two electric contacts consisting of a first phase contact and a first neutral contact; and
a ground device, provided on the ground, configured to cooperate with the on board device, the ground device being connected to an electric power source and equipped with two electric contacts consisting of a second phase contact and a second neutral contact, each of the electric contacts of the ground device being able to make contact with a corresponding one of the electric contacts of the on board device,
the on board device and the ground device being configured to apply an electric recharging power delivered by the electric power source to the electric energy storage means,
the first neutral contact being electrically connected to a chassis of the vehicle, and
the second neutral contact of the ground device being electrically connected to a ground connection; and
a ground connection controlling means for checking, during operational application of the electric recharging power to the electric energy storage means, that i) the first neutral contact of the on board device is in electrical contact with the second neutral contact of the ground device and ii) that the first phase contact of the on board device is in electric contact with the second phase contact of the ground device,
the ground connection controlling means including:
a transmitter, equipped with one of the ground device and the on board device, that applies an electric test signal to an electric circuit including the first and second phase contacts and the first and second neutral contacts, and
a receiver, equipped with the other of the ground device and the on board device, that receives the electric test signal only when an effective contact exists between the first and second phase contacts and an effective contact between the first and second neutral contacts, and that transmits a signal of reception of the electric test signal towards the transmitter,
wherein the ground device disconnects itself from the electric power source when the electric test signal transmitted by the transmitter is not received by the receiver, or when the signal of reception of the electric test signal transmitted by the receiver is either not received by the transmitter or is indicative of a break of the electric contact between the first and second neutral contacts or the first and second phase contacts,
wherein the on board device includes a connection between the first phase contact and the first neutral contact, consisting of a wave trap circuit in series with a primary of a first transformer, a secondary of said first transformer connected to the receiver, and
wherein the ground device includes a connection between the second phase contact and the second neutral contact, consisting of a wave trap circuit in series with a primary of a second transformer, a secondary of said second transformer connected to the transmitter.

\* \* \* \* \*